US011267926B2

(12) United States Patent
Poppenberg et al.

(10) Patent No.: US 11,267,926 B2
(45) Date of Patent: *Mar. 8, 2022

(54) LOW-DAMPING POLYURETHANE ELASTOMER

(71) Applicant: BASF SE, Ludwigshafen am Rhein (DE)

(72) Inventors: Johannes Poppenberg, Wyandotte, MI (US); Waldemar Meier, Lemfoerde (DE); Christina Tepper, Lemfoerde (DE); Markus Susoff, Kassel (DE); Dejan Petrovic, Lemfoerde (DE); Steffen Richter, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 338 days.

This patent is subject to a terminal disclaimer.

(21) Appl. No.: 16/346,715

(22) PCT Filed: Nov. 14, 2017

(86) PCT No.: PCT/EP2017/079173
§ 371 (c)(1),
(2) Date: May 1, 2019

(87) PCT Pub. No.: WO2018/087385
PCT Pub. Date: May 17, 2018

(65) Prior Publication Data
US 2019/0276582 A1    Sep. 12, 2019

(30) Foreign Application Priority Data
Nov. 14, 2016  (EP) .................................... 16198630

(51) Int. Cl.
| C08G 18/48 | (2006.01) |
| C08G 18/12 | (2006.01) |
| C08G 18/32 | (2006.01) |
| C08G 18/40 | (2006.01) |
| C08G 18/42 | (2006.01) |
| C08G 18/76 | (2006.01) |
| C08J 9/12 | (2006.01) |
| C08G 18/79 | (2006.01) |

(52) U.S. Cl.
CPC ......... *C08G 18/12* (2013.01); *C08G 18/3228* (2013.01); *C08G 18/3246* (2013.01); *C08G 18/4018* (2013.01); *C08G 18/4238* (2013.01); *C08G 18/4277* (2013.01); *C08G 18/4854* (2013.01); *C08G 18/7642* (2013.01); *C08G 18/7678* (2013.01); *C08G 18/797* (2013.01); *C08J 9/125* (2013.01); *C08G 2110/005* (2021.01); *C08G 2110/0008* (2021.01); *C08G 2110/0066* (2021.01); *C08G 2110/0083* (2021.01); *C08G 2350/00* (2013.01); *C08G 2410/00* (2013.01); *C08J 2203/10* (2013.01); *C08J 2205/044* (2013.01); *C08J 2375/12* (2013.01)

(58) Field of Classification Search
CPC .. C08G 18/12; C08G 18/302; C08G 18/3228; C08G 18/3246; C08G 18/4018; C08G 18/4238; C08G 18/4277; C08G 18/4854; C08G 18/7642; C08G 18/7678; C08G 18/797; C08G 2110/0008; C08G 2110/005; C08G 2110/0066; C08G 2110/0083; C08G 2350/00; C08G 2410/00; C08J 9/125; C08J 2203/10; C08J 2205/044; C08J 2375/12
See application file for complete search history.

(56) References Cited

U.S. PATENT DOCUMENTS

| 3,615,972 A | 10/1971 | Morehouse, Jr. et al. |
| 4,647,596 A | 3/1987 | Ishii et al. |

(Continued)

FOREIGN PATENT DOCUMENTS

| CN | 106397706 A | 2/2017 |
| DE | 36 13 961 A1 | 10/1986 |

(Continued)

OTHER PUBLICATIONS

International Search Report issued Feb. 9, 2018 in PCT/EP2017/079173, 3 pages
International Preliminary Report on Patentability dated May 16, 2019 in PCT/EP2017/079173 (with English translation), 21 pages.
U.S. Appl. No. 16/331,400, filed Mar. 7, 2019, Petrovic, D., et al.

(Continued)

*Primary Examiner* — John M Cooney
(74) *Attorney, Agent, or Firm* — Grüneberg and Myers PLLC

(57) ABSTRACT

The present invention relates to a method of preparing a polyurethane elastomer, said method comprising the step of reacting at least one isocyanate composition (ZI) and one polyol composition (ZP) comprising a poly-ε-caprolactone polyol and an α-hydro-ω-hydroxy-poly(oxytetramethylene) polyol to obtain an isocyanate-functional prepolymer and the step of reacting the prepolymer obtained as per step (i) with at least one chain extender (KV). The present invention further relates to a polyurethane elastomer obtained or obtainable according to a method of the invention and also to the method of using a polyurethane elastomer according to the invention or a polyurethane elastomer obtained or obtainable according to a method of the invention in the manufacture of a shaped article, especially a damping element, a shock absorber or a stop buffer or part of a shoe or of a shoe sole, for example part of an insert sole or of a midsole.

20 Claims, 3 Drawing Sheets

(56) References Cited

U.S. PATENT DOCUMENTS

Figure 1:
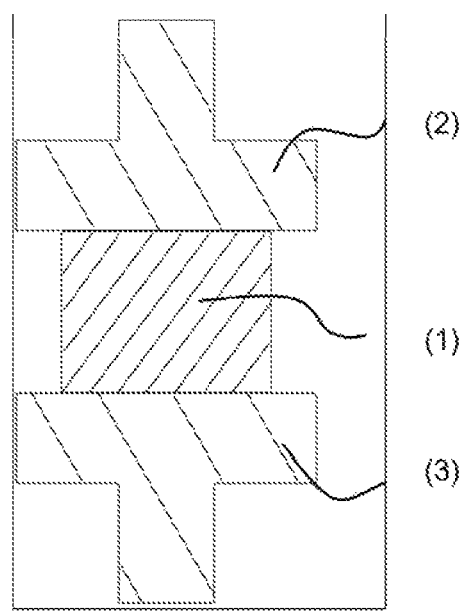

| | | | |
|---|---|---|---|
| 5,498,747 A | 3/1996 | Pohl et al. | |
| 6,184,410 B1 | 2/2001 | Bollmann et al. | |
| 6,730,807 B1 | 5/2004 | Häberle et al. | |
| 2010/0038579 A1* | 2/2010 | Duwenhorst | C08G 18/7671 252/62.54 |
| 2014/0342110 A1* | 11/2014 | Zhu | C08G 18/7614 428/36.9 |
| 2016/0333134 A1 | 11/2016 | Hieber et al. | |

FOREIGN PATENT DOCUMENTS

| | | |
|---|---|---|
| DE | 195 48 770 A1 | 6/1997 |
| DE | 195 48 771 A1 | 6/1997 |
| DE | 0 940 389 A2 | 9/1999 |
| DE | 198 21 668 A1 | 11/1999 |
| DE | 100 04 328 A1 | 8/2001 |
| DE | 10 2013 021 027 A1 | 6/2015 |
| EP | 0 036 994 A2 | 10/1981 |
| EP | 0 062 835 A1 | 10/1982 |
| EP | 0 250 969 A1 | 1/1988 |
| EP | 1 379 568 | 1/2004 |
| KR | 10-2015-0101087 A | 9/2015 |
| WO | WO 02/081537 A1 | 10/2002 |

OTHER PUBLICATIONS

U.S. Appl. No. 16/086,667, filed Sep. 20, 2018, US 2019-0071535 A1, Poeselt, E., et al.

U.S. Appl. No. 15/781,504, filed Jun. 5, 2018, US 2018-027821 A1, Meier, W.

U.S. Appl. No. 16/347,011, filed May 2, 2019, Poppenberg, J., et al.

* cited by examiner

LOW-DAMPING POLYURETHANE ELASTOMER

The present invention relates to a method of preparing a polyurethane elastomer, said method comprising the step of reacting at least one isocyanate composition (ZI) and one polyol composition (ZP) comprising a poly-ε-caprolactone polyol and an α-hydro-ω-hydroxy-poly(oxytetramethylene) polyol to obtain an isocyanate-functional prepolymer and the step of reacting the prepolymer obtained as per step (i) with at least one chain extender (KV). The present invention further relates to a polyurethane elastomer obtained or obtainable according to a method of the invention and also to the method of using a polyurethane elastomer according to the invention or a polyurethane elastomer obtained or obtainable according to a method of the invention in the manufacture of a shaped article, especially a damping element, a shock absorber or a stop buffer or part of a shoe or of a shoe sole, for example part of an insert sole or of a midsole.

Elastomers based on polyisocyanate polyaddition products and their method of preparation are common general knowledge and have been extensively described, for example in EP-A 62 835, EP-A 36 994, EP-A 250 969, DE-A 195 48 770 and DE-A 195 48 771, EP 1,379,568 B1. Compact and microcellular materials are known.

Shaped parts in microcellular polyurethane are frequently used as damping elements in the automotive sector, where they need to be able to withstand high mechanical stresses for many years while at the same time possessing a high level of hydrolysis resistance.

There are also some specific applications where the microcellular polyurethane further has to have very good dynamic properties.

These dynamic properties include specifically the requirement of very low damping (a very low loss angle) and very low dynamic stiffening at frequencies in the range up to 1000 Hz. In fact, the properties of polyurethane elastomers are expected to meet ever higher requirements.

The problem addressed by the present invention was therefore that of providing polyurethane elastomers which in addition to good mechanical properties have hydrolysis resistance and low-temperature flexibility as well as meeting the dynamic requirements. The problem addressed by the present invention was more particularly that of providing polyurethane elastomers having low damping while also having low dynamic stiffening in a high range of frequencies.

This problem is solved according to the present invention by a method of preparing a polyurethane elastomer, said method comprising at least the steps (i) and (ii):
(i) reacting at least one isocyanate composition (ZI) and one polyol composition (ZP) comprising a poly-ε-caprolactone polyol and an α-hydro-ω-hydroxypoly (oxytetramethylene) polyol to obtain an isocyanate-functional prepolymer,
(ii) reacting the prepolymer obtained as per step (i) with at least one chain extender (KV).

According to a further aspect, the present invention also provides a polyurethane elastomer obtained or obtainable by a method of preparing a polyurethane elastomer that comprises at least the steps (i) and (ii):
(i) reacting at least one isocyanate composition (ZI) and one polyol composition (ZP) comprising a poly-ε-caprolactone polyol and an α-hydro-ω-hydroxypoly (oxytetramethylene) polyol to obtain an isocyanate-functional prepolymer,
(ii) reacting the prepolymer obtained as per step (i) with at least one chain extender (KV).

The method of the present invention comprises, at least, the steps (i) and (ii). The method may also comprise further steps, for example shaping steps or a heat treatment. Step (i) comprises reacting the isocyanate composition (ZI) with the polyol composition (ZP) comprising a poly-ε-caprolactone polyol and an α-hydro-ω-hydroxypoly(oxytetramethylene) polyol to obtain an isocyanate-functional prepolymer. The prepolymer obtained as per step (i) is reacted in step (ii) with at least one chain extender (KV).

The inventors found that, surprisingly, the polyurethane elastomers obtained with the method of the present invention or the polyurethane elastomers of the present invention have very low dynamic stiffening and also very low damping (a very low loss angle).

In an exemplary embodiment of the method according to the present invention, the polyol component (ZP) employed in the reacting step as per step (i) comprises not only poly-ε-caprolactone polyol and an α-hydro-ω-hydroxypoly (oxytetramethylene) polyol but also further polyols and optionally further chain extender or crosslinker. According to the present invention, for example, the reacting step is effected at a temperature in the range from 110 to 180° C., preferably in the range from 130 to 170° C. and more preferably in the range from 140 to 155° C. to form an isocyanate-functional prepolymer.

According to the invention, the NCO content of the isocyanate-terminated prepolymer thus obtained is preferably in the range from 2 to 20 wt %, more preferably in the range from 2 to 10 wt % and especially in the range from 4 to 8 wt %.

The proportion of the polyol component used for preparing the isocyanate-terminated prepolymer is preferably not less than 50 wt %, more preferably not less than 80 wt %, yet more preferably not less than 90 wt % and especially 100 wt %. The present invention also allows for the use of further polyols in the reacting step as per step (ii).

In one embodiment of the method according to the present invention, step (i) provides a prepolymer which preferably has an isocyanate (NCO) content of 2% to 8%, more preferably of 2.5% to 7.5%, yet more preferably of 3% to 6.5% and especially of 3 to 5.5% (hereinafter also referred to as version 1 of the method). The isocyanate content is determined as described in Example 1. The isocyanate employed in this embodiment is preferably NDI, while it is more preferable for this embodiment to employ not only NDI but also a further isocyanate, for example MDI or TODI. Preference is given to employing NDI combined with MDI.

In a further embodiment, therefore, the present invention also provides a method as described above wherein the reacting step as per step (i) employs the components in such amounts that the prepolymer obtained as per step (i) has an isocyanate (NCO) content in the range from 2% to 8%.

In an alternative embodiment of the method, step (i) may provide a prepolymer which preferably has an isocyanate (NCO) content of 8% to 22%, more preferably of 10% to 21% and yet more preferably of 12%-20% (hereinafter also referred to as version 2 of the method). The isocyanate content is determined as described in Example 1. The isocyanate employed in this embodiment is preferably MDI. According to the present invention, it is also possible to employ a further isocyanate, for example NDI.

In an alternative embodiment, the present invention also provides a method as described above wherein the reacting step as per step (i) employs the components in such amounts that the prepolymer obtained as per step (i) has an isocyanate (NCO) content in the range from 8% to 22%.

The prepolymer obtained is then reacted with the chain extender (KV) in step (ii), wherein optionally further polyols or further chain extenders and optionally a catalyst, optionally a blowing agent and/or crosslinker and any auxiliary and/or added substance materials not admixed at all or only incompletely in the first step may be added.

According to the present invention, the prepolymer obtained as per step (i) is preferably reacted in step (ii) in such amounts that in this step the equivalence ratio of NCO groups to total reactive hydrogen atoms is in the range from 0.8:1 to 1.5:1, preferably in the range from 1:1 to 1.3:1 and especially in the range from 1.02:1 to 1.15:1. Here a ratio of 1:1 corresponds to an isocyanate index of 100. The isocyanate index in the context of the present invention is the stoichiometric ratio of isocyanate groups to isocyanate-reactive groups, multiplied by 100.

The method of the present invention includes, firstly, embodiments wherein step (i) utilizes a suitable choice for the amounts of the compounds employed to obtain a prepolymer having an isocyanate (NCO) content of 2% to 8%. Here the reacting step as per step (i) is typically carried out at a temperature in the range from 110 to 180° C. (version 1).

In a further embodiment, therefore, the present invention also provides a method as described above wherein the components are employed in such amounts that the prepolymer obtained as per step (i) has an isocyanate (NCO) content in the range from 2% to 8%. In a further embodiment, the present invention further also provides a method as described above wherein the reacting step as per step (i) is effected at a temperature in the range from 110° C. to 180° C. (version 1).

The method of the present invention further also includes embodiments wherein step (i) utilizes a suitable choice for the amounts of the compounds employed to obtain a prepolymer having an isocyanate (NCO) content of 8% to 22%. Here the reacting step as per step (i) is typically carried out at a temperature in the range from 40 to 110° C. (version 2).

In a further embodiment, therefore, the present invention also provides a method as described above wherein the reacting step as per step (i) employs the components in such amounts that the prepolymer obtained as per step (i) has an isocyanate (NCO) content in the range from 8% to 22%. In a further embodiment, the present invention further also provides a method as described above wherein the reacting step as per step (i) is effected at a temperature in the range from 40° C. to 110° C. (version 2).

Unless otherwise stated, the explanations which follow all relate to all embodiments encompassed by the invention, especially to the two aforementioned embodiments.

According to step (i) an isocyanate composition (ZI) and a polyol composition (ZP) comprising a poly-ε-caprolactone polyol and an α-hydro-ω-hydroxypoly(oxytetramethylene) polyol are reacted. The polyol composition (ZP) comprises a poly-ε-caprolactone polyol and an α-hydro-ω-hydroxypoly(oxytetramethylene) polyol and may comprise further components, especially further isocyanate-reactive substances, for example further polyols. Suitable polyols are known per se to a person skilled in the art. Polyethers, polyesters or polycarbonates are examples of suitable polyols.

According to the present invention, any poly-ε-caprolactone polyols are employable, especially those having a number average molecular weight in the range from 1500 to 2500 g/mol. Preferably, poly-ε-caprolactone diols are employed, i.e., those poly-ε-caprolactone polyols obtained or obtainable using a difunctional starter. Suitable starters for the purposes of the present invention include, for example, diols having a number average molecular weight in the range from 80 to 1500 g/mol, for example polyether polyols or polyester polyols. Especially suitable are polyether polyols, especially long-chain polyether diols such as, for example, α-hydro-ω-hydroxypoly(oxytetramethylene) diols.

In a further embodiment, the present invention also provides a method as described above wherein the poly-ε-caprolactone polyol employed is obtainable or obtained by reacting ε-caprolactone and a starter molecule selected from the group consisting of α-hydro-ω-hydroxypoly(oxytetramethylene) diols, polyethylene glycols and polypropylene glycols.

In a further embodiment, the present invention therefore also provides a method as described above wherein the poly-ε-caprolactone polyol employed is obtainable or obtained by reacting ε-caprolactone and a starter molecule selected from the group consisting of diols having a number average molecular weight in the range from 80 to 1500 g/mol.

Suitable starter molecules are more particularly selected from the group consisting of neopentyl glycol (NPG), 1,4-butanediol (BDO), 1,6-hexanediol (HDO) and long-chain polyether diols having a number average molecular weight in the range from 800 to 1200 g/mol, preferably 900 to 1100 g/mol.

Number average molecular weights for the purposes of the present invention are obtained, unless otherwise stated, by determining the OH number. Suitable measuring conditions are known to the person skilled in the art.

In a further embodiment, the present invention also provides a method as described above wherein the poly-ε-caprolactone polyol employed is obtained or obtainable by reacting ε-caprolactone and a starter molecule selected from the group consisting of α-hydro-ω-hydroxy-poly(oxytetramethylene) diols, polyethylene glycols and polypropylene glycols, preferably from the group consisting of α-hydro-ω-hydroxypoly(oxytetramethylene) diols having a number average molecular weight in the range from 150 to 1500 g/mol, polyethylene glycols having a number average molecular weight in the range from 150 to 1500 g/mol and polypropylene glycols having a number average molecular weight in the range from 150 to 1500 g/mol.

The polyol composition (ZP) further comprises an α-hydro-ω-hydroxypoly(oxytetramethylene) polyol. Suitable α-hydro-ω-hydroxypoly(oxytetramethylene) polyols are known per se. Suitable for the purposes of the present invention are preferably hydro-ω-hydroxypoly(oxytetramethylene) polyols having a number average molecular weight in the range from 1500 to 2500 g/mol. Mixtures of two or more hydro-ω-hydroxypoly(oxytetramethylene) polyols having differing molecular weight are also employable in the context of the present invention.

The composition of the polyol composition (ZP) can vary within comparatively wide limits. Preferably, in the context of the present invention, the proportion of α-hydro-ω-hydroxypoly(oxytetramethylene) polyol of the polyol composition (ZP) is in the range from 0.1 to 50 wt %, preferably in the range from 10 35 wt %, particularly preferably in the range from 15 to 25 wt %. In a preferred embodiment, the polyol composition (ZP) consists of the poly-ε-caprolactone polyol and the α-hydro-ω-hydroxypoly(oxytetramethylene) polyol.

In a further embodiment, the present invention also provides a method as described above wherein the polyol composition comprises the α-hydro-ω-hydroxypoly(oxytetramethylene) polyol in an amount from 0.1 to 50 wt %, based on the polyol composition.

In a further embodiment, the present invention also provides a method as described above wherein the poly-ε-caprolactone polyol and/or the α-hydro-ω-hydroxypoly(oxytetramethylene) polyol have a number average molecular weight in the range from 1500 to 2500 g/mol.

For example, the number average molecular weight of the two polyols of the mixture of poly-ε-caprolactone polyols and α-hydro-ω-hydroxypoly(oxytetramethylene) polyols is approximately 2000 g/mol.

The isocyanate composition (ZI) comprises one or more polyisocyanates. Suitable polyisocyanates are known per se to a person skilled in the art. Isocyanates for the purposes of the present invention are preferably organic isocyanates, more preferably aliphatic, cycloaliphatic, araliphatic and/or aromatic isocyanates, more preferably diisocyanates. Preferred diisocyanates are tri-, tetra-, penta-, hexa-, hepta- and/or octamethylene diisocyanate, 2-methyl-pentamethylene diisocyanate-1,5,2-ethylbutylene diisocyanate-1,4, pentamethylene diisocyanate-1,5, butylene diisocyanate-1,4,1-isocyanato-3,3,5-trimethyl-5-isocyanatomethyl-cyclohexane (isophorone diisocyanate (IPDI)), 1,4- and/or 1,3-bis(isocyanatomethyl)cyclohexane (HXDI), 1,4cyclohexane diisocyanate, 1-methyl-2,4- and/or -2,6-cyclohexane diisocyanate, 4,4'-, 2,4'- and/or 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), o-tolidine diisocyanate (TODD, p-phenyl diisocyanate (PPDI), 1,2-diphenylethane diisocyanate and/or phenylene diisocyanate, 4,4'-, 2,4'- and 2,2'-dicyclohexylmethane diisocyanate (H12 MDI), 2,4-paraphenylene diisocyanate (PPDI), 2,4-tetramethylene xylene diisocyanate (TMXDI), preferably 2,2'-, 2,4'- and/or 4,4'-diphenylmethane diisocyanate (MDI) and/or 1,6-hexamethylene diisocyanate (HDI).

Particular preference is given to 1,5-naphthalene diisocyanate (NDI), 4,4'-diphenylmethane diisocyanate (MDI), p-phenyl diisocyanate (PPDI), and/or o-tolidine diisocyanate (TODI). 1,5-Naphthylene diisocyanate (NDI) is more preferable.

In a further embodiment, the present invention also provides a method as described above wherein the polyisocyanate composition comprises an isocyanate selected from the group consisting of 1,5-naphthylene diisocyanate (NDI), 4,4'-diphenylmethane diisocyanate (MDI), p-phenyl diisocyanate (PPDI) and o-tolidine diisocyanate (TODD, or mixtures thereof.

In a further embodiment, the present invention also provides a method as described above wherein the polyisocyanate composition comprises 1,5-naphthylene diisocyanate (NDI) in an amount ranging from 90 to 100 wt % based on the entire polyisocyanate composition. It is further preferable for the polyisocyanate composition to consist of 1,5-naphthylene diisocyanate (NDI).

According to the present invention, the prepolymer obtained as per step (i) is reacted with a chain extender (KV) in step (ii). Further compounds may be added in this reacting step.

In a further embodiment, therefore, the present invention also provides a method as described above wherein the reacting step as per step (ii) employs further components selected from the group consisting of polyols, blowing agents, water, chain-extending agents and/or crosslinking agents, catalysts, other auxiliaries and/or added substances.

Blowing agents are employable for example in the present invention. These blowing agents may also comprise water. Water aside, commonly/generally known chemically and/or physically acting compounds are yet additionally employable as blowing agents.

Chemical blowing agents are compounds that react with isocyanate to form gaseous products, examples being water or formic acid. Physical blowing agents are compounds which are present in the polyurethane production ingredients in dissolved or emulsified form and vaporize under the conditions of polyurethane formation.

Suitable blowing agents for the purposes of the present invention include, for example, low-boiling liquids which vaporize under the influence of the exothermic polyaddition reaction. Liquids that are inert with regard to the organic polyisocyanate and have boiling points below 100° C. are particularly suitable. Examples of liquids of this type, which are preferably used, are halogenated, preferably fluorinated, hydrocarbons, e.g., methylene chloride and dichloromonofluoromethane, per- or partially fluorinated hydrocarbons, e.g., trifluoromethane, difluoromethane, difluoroethane, tetrafluoroethane and heptafluoropropane, hydrocarbons, e.g., n-butane, isobutane, n-pentane, isopentane and also the technical-grade mixtures thereof, propane, propylene, hexane, heptane, cyclobutane, cyclopentane and cyclohexane, dialkyl ethers, preferably, for example, dimethyl ether, diethyl ether and furan, carboxylic acids, for example, farmic acid, carboxylic esters, preferably, for example, methyl and ethyl formates, ketones, preferably, for example, acetone, and/or fluorinated and/or perfluorinated, tertiary alkylamines, preferably, for example, perfluorodimethylisopropylamine.

It is similarly possible to use mixtures of these low-boiling liquids with one another and/or with other substituted or unsubstituted hydrocarbons. The best amount of blowing agent depends on the target density and also on the amount of the preferably co-used water. Satisfactory results are generally obtained with amounts of 1 wt % to 15 wt %, preferably 2 wt % to 11 wt %, based on the polyol composition (ZP).

A preferred embodiment employs a blowing agent comprising a mixture comprising one or more of these blowing agents and water, more preferably no physical blowing agents and yet more preferably water as sole blowing agent.

The water content in a preferred embodiment is in the range from 0.1 to 3 wt %, preferably in the range from 0.4 to 2.0 wt % and more preferably in the range from 0.6 to 1.5 wt %, based on the polyol composition (ZP).

Microbeads containing physical blowing agent may also be additionally admixed in the present invention. The microbeads are also employable in admixture with the aforementioned blowing agents.

The microbeads typically consist of a shell of thermoplastic polymer and are filled in the core with a liquid, low-boiling substance based on alkanes. The production of such microbeads is described for example in U.S. Pat. No. 3,615,972. The microbeads are generally from 5 to 50 μm in diameter. Examples of suitable microbeads are available under the trade name Expancell® from Akzo Nobel.

The microbeads are generally added in an amount of 0.5 to 5 wt %, based on the total weight of polyols used. A particularly preferred embodiment utilizes a mixture of microbeads and water as blowing agent without any further physical blowing agents being present.

It is particularly preferred to use water as sole blowing agent. Water is also useful as a chain extender in the context of the present invention. Therefore, in the context of the present invention, water can also be employed as a chain extender, in which case the water added is used in an amount in relation to the other starting materials such that the NCO/OH ratio is between 0.85 and 1.30, more preferably between 0.95 and 1.20.

Since the water acts not only as a crosslinker, by forming urea groups, but also as a blowing agent, by reacting with isocyanate groups to form carbon dioxide, it is itemized separately from any further crosslinkers and/or blowing agents.

The index is defined by the molar ratio of all the isocyanate groups of the isocyanate composition (ZI) which are used in the reaction to the isocyanate-reactive groups, i.e., the active hydrogens, of the polyol composition and of the chain extender and also of any water employed as blowing agent. "Any" is intended to denote in this context that the extender, if an extender is added, will always be included in the calculation. An index of 100 means that for every isocyanate group there is one active hydrogen atom, i.e., one isocyanate-reactive function. At indices above 100, there are more isocyanate groups than groups comprising active hydrogen atoms, e.g., OH groups.

The water quantities which may advantageously be used range from 0.01 wt % to 5 wt %, preferably from 0.3 wt % to 3.0 wt %, based on the weight of the polyol composition (ZP).

Crosslinkers and/or chain extenders are further employable in addition to the isocyanate-reactive components already described, especially crosslinkers and/or chain extenders having a molecular weight of below 500 g/mol, preferably 60 g/mol to 499 g/mol. These are preferably selected from the group of di- and/or trifunctional alcohols, di- to tetrafunctional polyoxyalkylene polyols and of alkyl-substituted aromatic diamines, or of mixtures of two or more of the recited extenders and/or crosslinkers. It is a crosslinker when there are more than two isocyanate-reactive groups present in one molecule.

As chain extenders and/or crosslinking agents it is preferable to use alkanediols having 2 to 12 carbon atoms, preferably having 2, 4 or 6 carbon atoms, more preferably ethanediol, 1,3-propanediol, 1,5-pentanediol, 1,6-hexanediol, 1,7-heptanediol, 1,8-octanediol, 1,9-nonanediol, 1,10-decanediol and preferably 1,4-butanediol. Preferred chain extending and/or crosslinking agents further include dialkylene glycols having 4 to 8 carbon atoms, preferably diethylene glycol and dipropylene glycol and/or di-, tri- or tetrafunctional polyoxyalkylene polyols.

Preferred chain extenders and/or crosslinkers further include branched and/or unsaturated alkanediols having preferably not more than 12 carbon atoms, preferably 1,2-propanediol, 2-methylpropanediol-1,3,2,2-dimethylpropanediol-1,3,2-butyl-2-ethylpropanediol-1,3, butene-2-diol-1,4 and butyne-2-diol-1,4, diesters of terephthalic acid with glycols of 2 to 4 carbon atoms, preferably terephthalic acid bis-ethylene glycol-1,4 or butanediol-1,4, hydroxyalkylene ethers of hydroquinone or of resorcinol, preferably 1,4-di(8-hydroxyethyl)hydroquinone or 1,3-di(6-hydroxyethyl)resorcinol, alkanolamines having 2 to 12 carbon atoms, preferably ethanolamine, 2-aminopropanol and 3-amino-2,2-dimethylpropanol, N-alkyldialkanolamines, e.g., N-methyl- and N-ethyldiethanolamine.

Higher-functional crosslinkers preferably include, for example, tri- and higher-functional alcohols, e.g., glycerol, trimethylolpropane, pentaerythritol and trihydroxycyclohexanes and also trialkanolamines, e.g., triethanolamine.

Preferred chain extenders and/or crosslinkers further include alkyl-substituted aromatic polyamines having molecular weights preferably of 122 g/mol to 400 g/mol, especially primary aromatic diamines having at least one alkyl substituent ortho to the amino groups which reduces the reactivity of the amino group by steric hindrance, which are room temperature liquids and are at least partly, but preferably wholly, miscible with the remaining components of the polyol composition (ZP) under the processing conditions.

The polyurethane elastomers of the present invention are preferably formed using the industrially readily available 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, so-called DETDA, isomeric mixtures of 3,3'-di- or 3,3',5,5'-tetraalkyl-substituted 4,4'-diaminodiphenylmethanes with 1 to 4 carbon atoms in the alkyl moiety, in particular methyl-, ethyl- and isopropyl-containing 3,3',5,5'-tetraalkyl-substituted 4,4'-diaminodiphenylmethanes and also mixtures of the recited tetraalkyl-substituted 4,4'-diaminodiphenylmethanes and DETDA.

To obtain specific mechanical properties, the alkyl-substituted aromatic polyamines are preferably also used in admixture with the aforementioned low molecular weight polyhydric alcohols, preferably di- and/or trihydric alcohols or dialkylene glycols.

Preferred chain extenders for the purposes of the present invention are selected from the group consisting of water, diols having a molecular weight in the range from 50 to 500 g/mol, triols having a molecular weight in the range from 50 to 500 g/mol and diamines having a molecular weight in the range from 50 to 500 g/mol. More preferable chain extenders are selected from the group consisting of water, diols having a molecular weight in the range from 50 to 200 g/mol, triols having a molecular weight in the range from 50 to 200 g/mol and diamines having a molecular weight in the range from 50 to 200 g/mol.

In a further embodiment, the present invention also provides a method as described above wherein the chain extender (KV) is selected from the group consisting of water, diols having a molecular weight in the range from 50 to 500 g/mol, triols having a molecular weight in the range from 50 to 500 g/mol and diamines having a molecular weight in the range from 50 to 500 g/mol.

The amounts used of the individual components may vary in the present invention. Suitable amounts for preparing polyurethane elastomers are known per se to a person skilled in the art. The polyol composition and the isocyanate composition and/or the chain extender are used in suitable amounts. Further compounds are employable in the reacting step in the context of the present invention.

A catalyst for example may be added to hasten the reaction of the starting materials.

This catalyst is added in the two-step method in the step of reacting a prepolymer with water. The catalyst may take the form of a single catalyst or of a mixture of two or more catalysts.

The catalyst is preferably an organometallic compound, such as a tin(II) salt of an organic carboxylic acid, preferably tin(II) dioctoate, tin(II) dilaurate, dibutyltin diacetate or dibutyltin dilaurate, while other organometallic compounds are bismuth salts, preferably bismuth(III) neodecanoate, bismuth 2-ethylhexanoate and bismuth octanoate, or the catalyst is a tertiary amine such as tetramethylethylenediamine, N-methylmorpholine, diethylbenzylamine, triethylamine, dimethylcyclohexylamine, diazabicyclooctane, N,N'-dimethylpiperazine, N-methyl,N'-(4-N-dimethylamino)butylpiperazine, N,N,N',N'',N''-pentamethyldiethylenediamine. Similar substances can also be used as catalysts.

Preferred catalysts further include amidines, preferably for example 2,3-dimethyl-3,4,5,6-tetra-hydropyrimidine, tris(dialkylaminoalkyl)-s-hexahydrotriazines, in particular tris(N,N-dimethyl-aminopropyl)-s-hexahydrotriazine, tetraalkylammonium hydroxides, preferably for example tetramethylammonium hydroxide.

Preferred catalysts further include N-methyl-N-dimethylaminoethylpiperazine and pentamethyldiethylenetriamine and also aromatic alkali metal carboxylates, alkali metal hydroxides, preferably for example sodium hydroxide, and alkali metal alkoxides, preferably for example sodium methoxide and potassium isopropoxide, and also alkali metal salts of long-chain fatty acids having 10 to 20 carbon atoms with or without OH side groups.

Very particular preference for use as catalyst is given to N-methyl-N-dimethylaminoethylpiperazine and pentamethyldiethylenetriamine or a mixture of N-methyl-N-dimethylaminoethylpiperazine and pentamethyldiethylenetriamine.

The catalysts are preferably used in amounts from 0.0001 part by weight to 0.1 part by weight per 100 parts by weight based on the polyol composition (ZP).

In the two-step process, the catalyst is preferably used in amounts of 0.001 wt % to 0.5 wt %, based on the weight of the prepolymer.

Customary auxiliary substance materials and/or added substance materials are further employable. Auxiliary substance materials and/or added substance materials take the form of a single substance or of a mixture of two or more auxiliary substance materials and/or added substance materials. Examples include surface-active substances, fillers, flame retardants, nucleators, oxidation inhibitors, lubricating and demolding aids, dyes and pigments, optionally stabilizers, preferably against hydrolysis, light, heat or discoloration, organic and/or inorganic fillers, reinforcing agents and/or plasticizers.

Stabilizers for the purposes of the present invention are additives to protect a plastic or a mixture of plastics from harmful environmental influences. Examples are primary and secondary antioxidants, hindered amine light stabilizers, UV absorbers, hydrolysis control agents, quenchers and flame retardants. Examples of commercial stabilizers are given in Plastics Additive Handbook, 5th Edition, H. Zweifel, ed., Hanser Publishers, Munich, 2001 ([1]), p. 98-S136.

Useful surface-active substances include, for example, compounds to augment the homogenization of the starting materials and possibly also capable of acting as cell structure regulators. Examples include emulsifiers, e.g., the sodium salts of castor oil sulfates or of fatty acids, and also salts of fatty acids with amines, for example diethylamine oleate, diethanolamine stearate, diethanolamine ricinoleate, salts of sulfonic acids, e.g., alkali metal or ammonium salts of dodecylbenzene- or dinaphthylmethanedisulfonic acid and ricinoleic acid; foam stabilizers, such as siloxane-oxyalkylene interpolymers and other organosiloxanes, ethoxylated alkylphenols, ethoxylated fatty alcohols, paraffin oils, castor oil esters or, to be more precise, ricinoleic esters, Turkey red oil and peanut oil and cell regulators, such as paraffins, fatty alcohols and dimethylpolysiloxanes. To improve the emulsifying effect, the cell structure and/or its stabilization it is further possible to use oligomeric polyacrylates having polyoxyalkylene and fluoroalkane moieties as side groups. Surface-active substances are typically used in amounts from 0.01 part by weight to 5 parts by weight, based on 100 parts by weight based on polyol composition (ZP).

Fillers, especially reinforcing fillers, include the customary, familiar organic and inorganic fillers, reinforcing agents and weighting agents. Specific examples are inorganic fillers such as silicatic minerals, for example sheet-silicates such as antigorite, serpentine, hornblendes, amphibols, chrisotile, talc; metal oxides, such as kaolin, aluminum oxides, aluminum silicate, titanium oxides and iron oxides, metal salts such as chalk, barite and inorganic pigments, such as cadmium sulfide, zinc sulfide and also glass particles. Useful organic fillers include for example carbon black, melamine, expandable graphite, rosin, cyclopentadienyl resins, graft polyols and graft polymers.

By way of reinforcing fillers it is preferable to use fibers, for example carbon fibers or glass fibers, particularly when a high level of heat resistance or very high stiffness is demanded, in which case the fibers may be endowed with adhesion promoters and/or sizers.

Organic and inorganic fillers may be used singly or as mixtures, and are typically added to the reaction mixture in amounts of 0.5 wt % to 50 wt %, preferably 1 wt % to 30 wt % based on the weight of the polyol composition (ZP) and of the isocyanate composition (ZI).

Suitable flame retardants include, for example, tricresyl phosphate, tris(2-chloroethyl) phosphate, tris(2-chloropropyl) phosphate, tris(1,3-dichloropropyl) phosphate, tris(2,3-dibromo-propyl) phosphate and tetrakis(2-chloroethyl) ethylene diphosphate.

Aside from the aforementioned halogen-substituted phosphates, it is also possible to use inorganic flame retardants such as red phosphorus, aluminum oxide hydrate, antimony trioxide, arsenic trioxide, ammonium polyphosphate and calcium sulfate or cyanuric acid derivatives, e.g., melamine, or mixtures of two or more flame retardants, e.g., ammonium phosphates and melamine, and also optionally starch and/or expandable graphite to confer flame retardancy on the polyurethane elastomers formed according to the present invention. It has generally proved advantageous to use from 5 parts by weight to 50 parts by weight and preferably from 5 parts by weight to 25 parts by weight of the recited flame retardants or flame retardant mixtures for every 100 parts by weight of constitutive components (a) and (b).

As nucleators there may be used, for example, talc, calcium fluoride, sodium phenyl-phosphinate, aluminum oxide and finely divided polytetrafluoroethylene in amounts up to 5 wt %, based on the total weight of the polyol composition (ZP) and of the isocyanate composition (ZI).

Suitable oxidation retarders and heat stabilizers which may be added to the polyurethane elastomers of the present invention include, for example, halides of metals of group I of the periodic table, e.g., sodium halides, potassium halides, lithium halides, optionally combined with copper(I) halides, e.g., chlorides, bromides or iodides, sterically hindered phenols, hydroquinones, and also substituted compounds of these groups and mixtures thereof, which are preferably used in concentrations up to 1 wt % based on the weight of the polyol composition (ZP) and of the isocyanate composition (ZI).

Examples of hydrolysis control agents are various substituted carbodiimides, such as preferably 2,2',6,6'-tetraisopropyldiphenylcarbodiimide or carbodiimides based on 1,3-bis(1-methyl-1-isocyanatoethyl)benzene as described for example in the documents DE 19821668 A1, U.S. Pat. No. 6,184,410, DE 10004328 A1, U.S. Pat. No. 6,730,807, EP 0 940 389 B1 or U.S. Pat. No. 5,498,747, which are generally used in amounts up to 4.0 wt %, preferably from 1.5 wt % to 2.5 wt % based on the weight of the polyol composition (ZP) and of the isocyanate composition (ZI).

Lubricating and demolding agents, generally likewise added in amounts up to 1 wt %, based on the weight of the polyol composition (ZP) and of the isocyanate composition (ZI), are stearic acid, stearyl alcohol, stearic esters and amides and also the fatty acid esters of pentaerythritol.

It is further possible to add organic dyes, such as nigrosine, pigments, e.g., titanium dioxide, cadmium sulfide, cadmium sulfide selenide, phthalocyanines, ultramarine blue or carbon black.

Further particulars of the abovementioned auxiliary and added-substance materials are found in the trade literature, for example in Plastics Additive Handbook, 5th edition, H. Zweifel, ed, Hanser Publishers, Munich, 2001, p. 98-S136.

The method of the present invention may comprise further steps, for example shaping steps, in which case shaped articles are obtained according to the present invention.

The shaped articles of the present invention are produced using, for example, low pressure technology in closed, advantageously temperature-regulated molds. The molds usually consist of metal, for example aluminum or steel. These procedures are described for example by Piechota and Rohr in "Integralschaumstoff", Carl-Hanser-Verlag, Munich, Vienna, 1975 or in "Kunststoff-handbuch", volume 7, 3rd edition, 1993, chapter 7.

The isocyanate-terminated prepolymer and the further components are preferably mixed for this at a temperature of 15 to 110° C. The reaction mixture is subsequently introduced into the mold, optionally under elevated pressure. The mixing step may be carried out mechanically using a stirrer or a stirring screw. Mold temperature is advantageously in the range from 20 to 160° C., preferably in the range from 40 to 120° C. and more preferably in the range from 70 to 110° C. Reaction mixture here, in the context of the invention, refers to the mixture of the isocyanate-terminated prepolymers, of the chain extender, of the blowing agents and of any further components at reaction conversions below 90%, based on the isocyanate groups of the prepolymer component. The amount of reaction mixture introduced into the mold is determined so as to obtain the desired density for the molded part. The amount of the system which is used is chosen so as to obtain a consolidation factor of preferably 1.1 to 8, more preferably 1.4 to 5 and especially 1.4 to 3.

According to the present invention, it is specifically the microcellular polyurethane elastomer which is preferably introduced into a mold where it cures. Useful molds, which are the negative of the molded parts, here include generally customary molds, for example metal molds, which have the shape and composition to ensure the three-dimensional shape of the molded parts which is in accordance with the present invention.

Surface temperature for the mold inside wall is preferably in the range from 40° C. to 105° C., more preferably in the range from 50° C. to 95° C. The molded parts are preferably formed at an NCO/OH ratio of 0.85 to 1.20, while the heated starting components are mixed and introduced into a heated, preferably tightly closing mold in an amount corresponding to the desired density for the molded part. Curing takes from 2 minutes to 60 minutes, at which point the molded parts are demoldable.

Alternatively, the reaction mixture may also be foamed free rise, for example in tubs or on a belt, to form polyurethane foams.

After the molded parts have been formed in the mold, they are preferably conditioned, for example for a period of 1 to 48 hours at temperatures of 70° C. to 140° C.

According to a further aspect, the present invention also provides a polyurethane elastomer obtained or obtainable by a method that comprises at least the steps (i) and (ii):

(i) reacting at least one isocyanate composition (ZI) and one polyol composition (ZP) comprising a poly-ε-caprolactone polyol and an α-hydro-ω-hydroxypoly(oxytetramethylene) polyol to obtain an isocyanate-functional prepolymer, (ii) reacting the prepolymer obtained as per step (i) with at least one chain extender (KV).

The polyurethane elastomers in the present invention may be compact or microcellular.

In a further embodiment, the present invention also provides a polyurethane elastomer as described above wherein the polyurethane elastomer is microcellular.

Regarding the compounds used and the preferred quantitative ratios, the above embodiments are referenced. Especially the explanations regarding method versions 1 and 2 of the present invention are referenced.

It was found in the context of the present invention that especially an NCO content for the prepolymer obtained as per step (i) in the range from 2 to 8% (version 1) or in an alternative embodiment in the range from 8 to 22% (version 2) leads to polyurethane elastomers having good profiles of properties.

Microcellular polyurethanes elastomers of the present invention have for example a DIN EN ISO 845 density of $0.1 \times 10^3$ kg/m$^3$ to $1.2 \times 10^3$ kg/m$^3$, preferably $0.2 \times 10^3$ kg/m$^3$ to $0.8 \times 10^3$ kg/m$^3$, preferably having a DIN EN ISO 1798 tensile strength of more than 2 N/mm$^2$, preferably in the range from 2 N/mm$^2$ to 8 N/mm$^2$, a DIN EN ISO 1798 elongation of more than 300%, preferably in the range from 300% to 700%, and a DIN ISO 34, B (b) tear strength of more than 8 N/mm, preferably in the range from 8 N/mm to 25 N/mm.

In one embodiment of the present invention the density also for example is in the range from $0.12 \times 10^3$ kg/m$^3$ to $0.5 \times 10^3$ kg/m$^3$ according to DIN EN ISO 845.

Preferred microcellular polyurethane elastomers in the context of the present invention further have, for example, a cell diameter of 0.05 mm to 0.5 mm and more preferably of 0.05 mm to 0.15 mm.

The microcellular polyurethane elastomers of the present invention preferably have a glass transition temperature below −40° C., more preferably below −55° C., and more preferably a DIN EN ISO 1856 compression set (at 80° C.) of below 25%.

The present invention encompasses various embodiments differing for example in the method of preparation and the properties of the polyurethanes obtained, in that for example materials differing in density are obtainable by establishing a differing isocyanate index in the production process.

The present invention encompasses particular embodiments wherein the polyurethane elastomer has a DIN EN ISO 845 density in the range from 0.12 to 0.8 g/cm$_3$.

The present invention according to a further aspect further also provides the method of using a polyurethane elastomer as described above or a polyurethane elastomer obtained or obtainable according to a method as described above, in the manufacture of a shaped article.

The present invention also provides shaped articles, preferably a damping element, a shock absorber or a stop buffer each manufactured from a polyurethane according to the present invention and/or comprising a polyurethane elastomer of the present invention.

Preferred shaped articles include, for example, a damping element, a shock absorber or a stop buffer for vehicle construction, preferably for air vehicle construction, water vehicle construction or land vehicle construction and more preferably for land vehicle construction, preferably as ancillary springs, stop buffers, transverse link bearings, rear axle subframe bearings, stabilizer bearings, longitudinal link bearings, spring strut support bearings, shock absorber bearings, bearings for triangular links, and/or in the form of an emergency wheel located on the wheel rim and, for example in the event of damage to a tire, permitting the vehicle to continue to run and to remain steerable.

The present invention according to a further aspect further also provides the method of using a polyurethane elastomer as described above or a polyurethane elastomer obtained or obtainable according to a method as described above, in the manufacture of a shaped article, wherein the shaped article is preferably a damping element, a shock absorber or a stop buffer or part of a shoe or of a shoe sole, for example part of an insert sole or of a midsole.

A polyurethane foam slab obtained according to the present invention may be shaped into, for example, the shoe soles or shoe sole parts by, for example, cutting, diecutting, shaving and/or thermoforming, optionally together with further materials, such as optionally further polyurethane foams or ethylene-vinyl acetate.

The polyurethane shoe soles of the present invention are preferably employed as a midsole, for example for general purpose footwear, sport shoes, sandals and boots. More particularly, the polyurethane shoe soles of the present invention are used as midsole for sport shoes. A shoe sole according to the present invention further also comprises shoe sole parts, for example heel parts or ball parts. Shoe soles of the present invention can also be used as insert soles or combisoles.

A method of the present invention leads in this case to polyurethane shoe soles having outstanding mechanical properties. More particularly, the polyurethane shoe soles of the present invention display high rebound resilience coupled with high hardnesses and low densities. It is further advantageous that especially on using polyols having a maximum functionality of 2.2 and omitting crosslinkers, the polyurethane shoe soles obtained are thermoformable. The polyurethane shoe soles obtained are further recyclable by remelting and thermoplastic processing, for example together with thermoplastic polyurethane. Finally, the use of hybrid materials is advantageous. In hybrid materials, a polyurethane element according to a method of the present invention is combined with other engineering materials, for example EVA, so as to obtain a structure comprising one or more layers consisting of the polyurethane according to the present invention under, over or between layers of other engineering materials.

Polyurethane shoe soles for the purposes of the present invention include one-part shoe soles, so-called combisoles, midsoles, insert soles or shoe sole parts, such as heel parts or ball parts. By insert soles are meant insert parts for the forefoot, insert parts for the whole foot or footbeds. Shoe soles within the meaning of the present invention further include polyurethane hybrid shoe soles which, in addition to the polyurethane of the present invention, comprise further materials, such as further polyurethanes and/or ethylene-vinyl acetate.

The polyurethane shoe soles of the present invention more particularly comprise outsoles, midsoles or sole parts, such as heel parts, ball parts, insert parts for the forefoot, insert parts for the whole foot or footbeds.

The polyurethane shoe soles of the present invention are typically from 100 to 350 g/L, preferably 120 to 280 g/L and more preferably 130 to less than 250 g/L and especially 150 to 220 g/L in density. The polyurethane shoe sole density here is to be understood as meaning the averaged density across the entire foam, i.e., in the case of integral skin foams, this particular relates to the average density of the entire foam including core and skin layer. Further materials besides the polyurethane of the present invention, in the case of hybrid shoe soles for example, are not included to quantify the density.

The advantages of the polyurethane elastomers according to the present invention, and of the shaped articles obtained therefrom, include, for example, very low dynamic stiffening, extremely high rebound resiliencies and also very low damping (a very low loss angle).

SHORT DESCRIPTION OF FIGURES

FIG. 1: shows the schematic test setup for determining the stiffening factor. The test specimen (1) is inserted between a test adapter at the top (2) and a test adapter at the bottom (3).

Figure 2A:
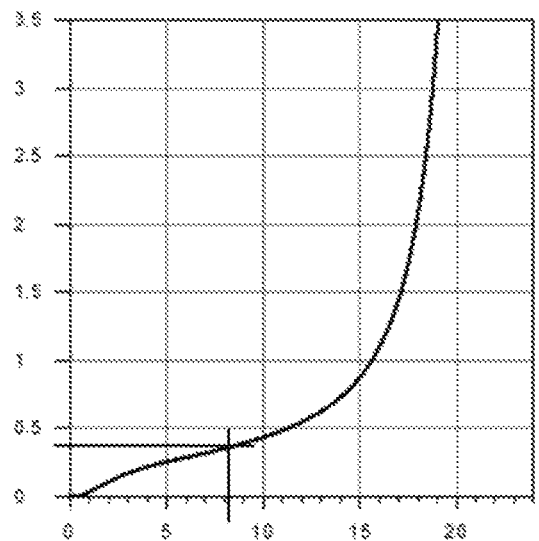
Figure 2B:
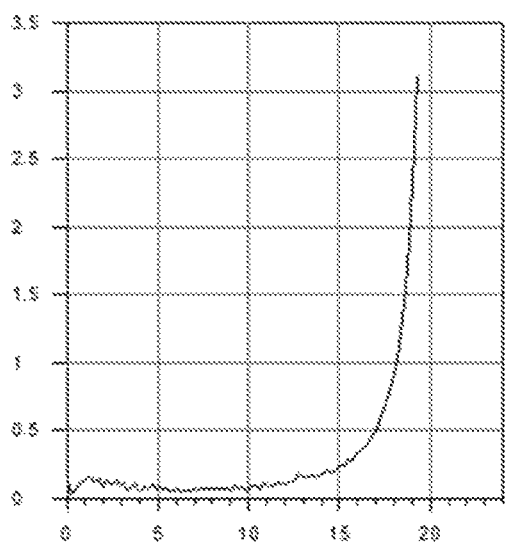

FIG. 2: shows the result of the measurement on compressing the material. To analyze the measurement, the force is plotted against the distance (FIG. 2*a*) and the derivative as stiffness against distance (FIG. 2*b*).

FIG. 2*a*: shows the static curve where the x-axis represents the distance (in mm) and the y-axis represents the force (in kN). Only the ascending branch is considered.

FIG. 2*b*: shows the first derivative of the trajectory of the static curve. The stiffness (y-axis, in kN/mm) is plotted against the distance (x-axis, in mm).

Figure 3:
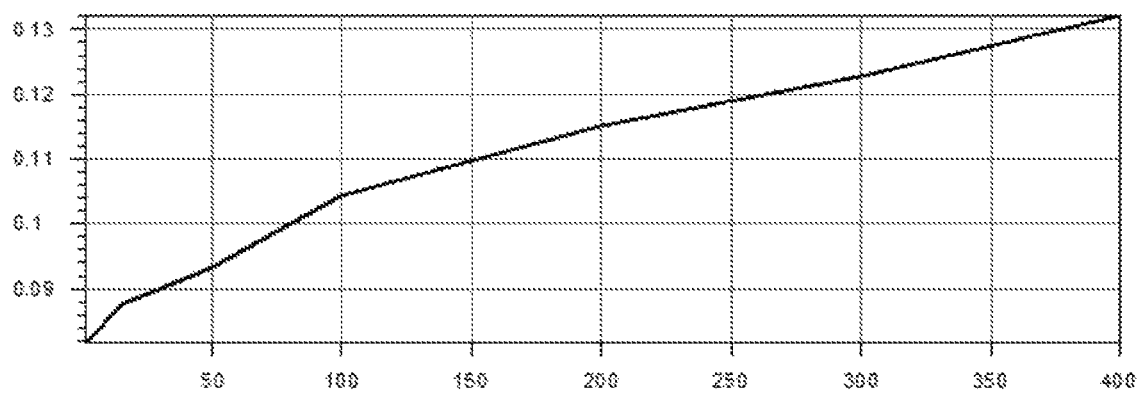

FIG. 3: shows the dynamic modulus (y-axis, in kN/mm) against the frequency (x-axis, in Hz).

Further embodiments of the present invention are derivable from the claims and the examples. It will be understood that the aforementioned and hereinbelow elucidated features of the article/method/uses according to the present invention can be used not just in the particular combination recited, but also in other combinations, without departing from the realm of the invention. For instance, the combination of a preferred feature with a particularly preferred feature or of a not further characterized feature with a particularly preferred feature, etc., is also implicitly comprehended even when this combination is not expressly mentioned.

Exemplary embodiments of the present invention, which do not limit the present invention, are recited hereinbelow. More particularly, the present invention also comprehends those embodiments which result from the hereinbelow recited dependency references and hence combinations. More particularly, in the recitation hereinbelow of a range of embodiments, for example the expression "The method according to any one of embodiments 1 to 4" is to be understood as meaning that every combination of the embodiments in this range is explicitly disclosed to a person skilled in the art, i.e., the expression is to be understood as interchangeable with "The method according to any one of embodiments 1, 2, 3 and 4".

1. A method of preparing a polyurethane elastomer, said method comprising at least the steps (i) and (ii):
   (i) reacting at least one isocyanate composition (ZI) and one polyol composition (ZP) comprising a poly-ε- caprolactone polyol and an α-hydro-ω-hydroxypoly (oxytetramethylene) polyol to obtain an isocyanate-functional prepolymer, (ii) reacting the prepolymer obtained as per step (i) with at least one chain extender (KV).

2. The method according to embodiment 1 wherein the reacting step as per step (i) employs the components in such amounts that the prepolymer obtained as per step (i) has an isocyanate (NCO) content in the range from 2% to 8%.
3. The method according to either of embodiments 1 and 2 wherein the reacting step as per step (i) is effected at a temperature in the range from 110° C. to 180° C.
4. The method according to embodiment 1 wherein the reacting step as per step (i) employs the components in such amounts that the prepolymer obtained as per step (i) has an isocyanate (NCO) content in the range from 8% to 22%.
5. The method according to either of embodiments 1 and 4 wherein the reacting step as per step (i) is effected at a temperature in the range from 40° C. to 110° C.
6. The method according to any one of embodiments 1 to 5 wherein the reacting step as per step (ii) employs further components selected from the group consisting of polyols, blowing agents, comprising water, chain-extending agents and/or crosslinking agents, catalysts and other auxiliaries and/or added substances.
7. The method according to any one of embodiments 1 to 6 wherein the poly-ε-caprolactone polyol is obtainable or obtained by reacting ε-caprolactone and a starter molecule selected from the group consisting of diols having a number average molecular weight in the range from 80 to 1500 g/mol.
8. The method according to any one of embodiments 1 to 7 wherein the poly-ε-caprolactone polyol is obtainable or obtained by reacting ε-caprolactone and a starter molecule selected from the group consisting of α-hydro-ω-hydroxypoly(oxytetramethylene) diols, polyethylene glycols and polypropylene glycols.
9. The method according to any one of embodiments 1 to 8 wherein the polyol composition comprises the α-hydro-ω-hydroxypoly(oxytetramethylene) polyol in an amount in the range from 0.1 to 50 wt %, based on the polyol composition.
10. The method according to any one of embodiments 1 to 9 wherein the polyisocyanate composition comprises an isocyanate selected from the group consisting of 1,5-naphthylene diisocyanate (NDI), 4,4'-diphenylmethane diisocyanate (MDI), p-phenyl diisocyanate (PPDI) and o-tolidine diisocyanate (TODI), or mixtures thereof.
11. The method according to any one of embodiments 1 to 10 wherein the polyisocyanate composition comprises 1,5-naphthylene diisocyanate (NDI) in an amount ranging from 90 to 100 wt % based on the entire polyisocyanate composition (ZI).
12. The method according to any one of embodiments 1 to 11 wherein the chain extender (KV) is selected from the group consisting of water, diols having a molecular weight in the range from 50 to 500 g/mol, triols having a molecular weight in the range from 50 to 500 g/mol, and diamines having a molecular weight in the range from 50 to 500 g/mol.
13. The method according to any one of embodiments 1 to 12 wherein the poly-ε-caprolactone polyol and/or the α-hydro-ω-hydroxypoly(oxytetramethylene) polyol have a number average molecular weight in the range from 1500 to 2500 g/mol.
14. A polyurethane elastomer obtained or obtainable by a method that comprises at least the steps (i) and (ii):
   (i) reacting at least one isocyanate composition (ZI) and one polyol composition (ZP) comprising a poly-ε-caprolactone polyol and an α-hydro-ω-hydroxypoly(oxytetramethylene) polyol to obtain an isocyanate-functional prepolymer,
   (ii) reacting the prepolymer obtained as per step (i) with at least one chain extender (KV).
15. The polyurethane elastomer according to embodiment 14 wherein the polyurethane elastomer is microcellular.
16. The polyurethane elastomer according to embodiment 14 or 15 having a density in the range from 0.12 to 0.8 kg/m$^3$ according to DIN EN ISO 845.
17. The method of using a polyurethane elastomer obtained or obtainable according to a method according to any one of embodiments 1 to 13 or of a polyurethane elastomer according to any one of embodiments 14 to 16 in the manufacture of a shaped article.
18. The method according to embodiment 17 wherein the shaped article is a damping element, a shock absorber or a stop buffer or part of a shoe or of a shoe sole, for example part of an insert sole or of a midsole.

The invention will now be more particularly described with reference to examples without limiting the subject matter of the invention.

EXAMPLES

1. Determination of NCO Content 1.1 Solutions Used:
  Di-n-hexylamine solution:
    166.8 g of di-n-hexylamine are made up with xylene to 1.0 L (in a 1 L volumetric flask) and the mixture is homogenized.
  1% bromophenol blue solution:
    0.5 g of bromophenol blue is dissolved in 49.5 g of ethanol and the solution is transferred to a pipette bottle.
1.2 Procedure:
  10 ml of the amine solution are introduced into an Erlenmeyer flask. 20 ml of chlorobenzene are then added. For an expected isocyanate content of 4%, 2 g-2.5 g of prepolymer are weighed into the flask with an accuracy of 0.1 mg (for other isocyanate concentrations, the weights have to be appropriately conformed). After dissolution is complete (visual check), 50 ml of methanol are added. After 3 drops of bromophenol blue solution have been added, the unconsumed amine is then backtitrated with HCl (c=1.0 mol/L) until the color changes from blue to yellow.
  Blank samples, i.e., samples without prepolymer, are treated in the same way except for the absence of the sample weight.
  The following formula is used for the computation:

$$NCO\ frel = \frac{(VBW - VProbe) * M * c * t}{m} * 100\%$$

VBW: consumption of HCl (1.0 mol/L) for blank value in L
  V Probe: consumption of HCl (1.0 mol/L) for sample in L
  M: molar mass of NCO 42.02 g/mol c: amount-of-substance concentration of HCl 1.0 mol/L
t: titer of HCl (1.0 mol/L)
m: sample weight of prepolymer in g

2. Example—Forming a Shaped Article 2.1 Compounds used:
polyol 1 polycaprolactone polyol, started with pTHF1000 having an OH number of about 56 (MW: ca 2000), obtained from Perstorp
polyol 2 polytetrahydrofuran (pTHF; polytetramethylene ether glycol, PTMEG) having an OH number of about 56 (MW: ca. 2000), obtained from BASF
polyol 3 polyester diol with OH number about 56 constructed from adipic acid and 1,4-butanediol (MW: ca. 2000), obtained from BASF
polyol 4 polycaprolactone polyol, started with neopentyl glycol having an OH number of about 56 (MW: ca 2000), obtained from BASF
polyol 5 polytetrahydrofuran (pTHF; polytetramethylene ether glycol, PTMEG) having an OH number of about 112 (MW: ca. 1000), obtained from BASF
polyol 6 polycaprolactone polyol, started with neopentyl glycol having an OH number of about 56 (MW: ca 2000), obtained from Perstorp
NDI 1,5-naphthylene diisocyanate 2.2 Forming an Isocyanate-Functional Prepolymer
One or more polymer polyols were heated to 140° C. and admixed at that temperature with a diisocyanate under intensive agitation. The exact amounts of the compounds used are reported in tables 1a to 1e.
An NCO-terminated prepolymer was obtained. Viscosity data and NCO content and also further properties of the materials obtained are reported in tables 2a to 2e.

2.3 Forming Shaped Cellular Articles
Crosslinker component:
32.7 parts by weight of a 50% aqueous solution of a fatty acid sulfonate,
16.4 parts by weight of water,
28 parts by weight of a carbodiimide based on 1,3-bis(1-isocyanato-1-methylethyl)benzene (TMXDI)
18.1 parts by weight of a fatty acid polyglycol ester,
4.2 parts by weight of a mixture of fatty acid polyglycol esters and amine salts of alkylbenzenesulfonates,
0.6 part by weight of a mixture of:
30 wt % of pentamethyldiethylenetriamine and
70 wt % of N-methyl-N'-(dimethylaminoethyl)piperazine.
100 parts by weight of the hot isocyanate-functional prepolymer (a) at 90° C. were intensively stirred with the hot crosslinker component at 50° C. for about 10 seconds. The reaction mixture was then introduced into a hot sealable metallic mold at 90° C., the mold was sealed and the reaction mixture was allowed to cure.

After 30 minutes the molded microcellular shaped article was demolded and thermally postcured by conditioning at 110° C. for 16 hours.

Good processability is ensured at 90° C. prepolymer viscosities of up to 4000 mPas. The examples show that the polyurethane elastomers of the present invention display a good combination of properties. There are many applications where polyurethane elastomers have to have a 100 Hz stiffening factor of above 1.8 coupled with a tan d at RT of above 0.015 and a tan d at 30° C. of above 0.15.

TABLE 1a

| Component | Example 1 | Example 2 | Example 3 | Example 4 |
|---|---|---|---|---|
| polyol 1 (parts by weight) | 750 | 750 | 833 | |
| polyol 2 (parts by weight) | 250 | 250 | 167 | 500 |
| polyol 6 (parts by weight) | | | | 500 |
| NDI (parts by weight) | 210 | 210 | 210 | 210 |

TABLE 1b

| Component | Example 5 | Example 6 | Example 7 | Example 8 |
|---|---|---|---|---|
| polyol 2 (parts by weight) | 250 | | 1000 | 250 |
| polyol 3 (parts by weight) | | 1000 | | |
| polyol 4 (parts by weight) | 750 | | | |
| polyol 5 (parts by weight) | | | | 750 |
| NDI (parts by weight) | 240 | 210 | 240 | 230 |

TABLE 1c

| Component | Example 9 | Example 10 | Example 11 | Example 12 | Example 13 |
|---|---|---|---|---|---|
| polyol 2 (parts by weight) | | 500 | | 1000 | |
| polyol 3 (parts by weight) | 1000 | | | | |
| polyol 4 (parts by weight) | | | 1000 | | 1000 |
| polyol 5 (parts by weight) | | 500 | | | |
| NDI (parts by weight) | 240 | 180 | 240 | 180 | 240 |

TABLE 1d

| Component | Example 14 | Example 15 | Example 16 | Example 17 | Example 18 | Example 19 |
|---|---|---|---|---|---|---|
| polyol 1 (parts by weight) | 800 | 800 | 800 | 800 | 800 | 800 |
| polyol 2 (parts by weight) | 200 | 200 | 200 | 200 | 200 | 200 |
| polyol 6 (parts by weight) | | | | | | |
| NDI (parts by weight) | 330 | 330 | 330 | 300 | 300 | 300 |

TABLE 1e

| Component | Example 20 | Example 21 | Example 22 | Example 23 | Example 24 |
|---|---|---|---|---|---|
| polyol 1 (parts by weight) | 800 | 800 | 800 | 800 | 800 |
| polyol 2 (parts by weight) | 200 | 200 | 200 | 200 | 200 |
| polyol 6 (parts by weight) | | | | | |
| NDI (parts by weight) | 270 | 270 | 270 | 240 | 240 |

TABLE 2a

| Property | Example 1 | Example 2 | Example 3 | Example 4 |
|---|---|---|---|---|
| prepolymer viscosity at 90° C. [mPas] | 2780 | 2780 | 2900 | 3060 |
| density g/l | 476 | 386 | 472 | 437 |
| tensile strength | 5.3 | 3.1 | 4.3 | 4.1 |
| elongation at break | 456 | 291 | 317 | 347 |
| tear strength | 14.5 | 12.3 | 15 | 15.1 |
| rebound resilience | 88 | 88 | 90 | 85 |
| stiffening factor at 100 Hz | 1.65 | 1.71 | 1.67 | 1.69 |
| tan d at RT | 0.01107999 | 0.01214569 | 0.01264846 | 0.01380332 |
| tan d at −30° C. | 0.090139275 | 0.101461835 | 0.12738376 | 0.13183071 |

TABLE 2b

| Property | Example 5 | Example 6 | Example 7 | Example 8 |
|---|---|---|---|---|
| prepolymer viscosity at 90° C. [mPas] | 2140 | 3560 | 2070 | 2560 |
| density g/l | 465 | 481 | 482 | 460 |
| tensile strength | 5.3 | 6.1 | 4.8 | 4.8 |
| elongation at break | 447 | 476 | 306 | 230 |
| tear strength | 17.5 | 24.2 | 14.8 | 14.7 |
| rebound resilience | 84 | 77 | 82 | 79 |
| stiffening factor at 100 Hz | 1.74 | 2.18 | 1.82 | 2.24 |
| tan d at RT | 0.013889798 | 0.02786077 | 0.0135561 | 0.03256369 |
| tan d at −30° C. | 0.132247 | 0.7111605 | 0.1646066 | 0.54513861 |

TABLE 2c

| Property | Example 9 | Example 10 | Example 11 | Example 12 | Example 13 |
|---|---|---|---|---|---|
| prepolymer viscosity at 90° C. [mPas] | 2632 | 9510 | 2160 | 9680 | 1600 |
| density g/l | 480 | 470 | 484 | 514 | 476 |
| tensile strength | 5.8 | 2.8 | 4.8 | 3.1 | 4.9 |
| elongation at break | 449 | 177 | 346 | 191 | 380 |
| tear strength | 23.6 | 8.4 | 19.6 | 10.4 | 19.5 |
| rebound resilience | 74 | 83 | 79 | 83 | 81 |
| stiffening factor at 100 Hz | 2.3 | 1.84 | 1.83 | 1.64 | 1.85 |
| tan d at RT | 0.02944064 | 0.02181259 | 0.018134668 | 0.010632635 | 0.016207199 |
| tan d at −30° C. | 0.73662872 | 0.141530387 | 0.28750117 | 0.177349143 | 0.295595373 |

TABLE 2d

| Property | Example 14 | Example 15 | Example 16 | Ex. 17 | Ex. 18 | Ex. 19 |
|---|---|---|---|---|---|---|
| prepolymer viscosity at 90° C. [mPas] | 831 | 831 | 831 | 987 | 987 | 987 |
| density g/l | 206 | 244 | 293 | 204 | 251 | 299 |
| tensile strength | 1.2 | 1.8 | 2.2 | 1.4 | 1.9 | 2.5 |
| elongation at break | 176 | 235 | 221 | 255 | 260 | 259 |
| tear strength | 5.4 | 6.4 | 8.3 | 5.3 | 6.9 | 8.4 |
| rebound resilience | 80 | 80 | 80 | 82 | 82 | 82 |
| stiffening factor at 100 Hz | . | . | . | . | . | . |
| tan d at RT | 0.027383602 | 0.024643488 | 0.02769392 | | | |
| tan d at −30° C. | 0.102379153 | 0.088010913 | 0.10777728 | | | |

TABLE 2e

| Property | Example 20 | Example 21 | Example 22 | Ex. 23 | Ex. 24 |
|---|---|---|---|---|---|
| prepolymer viscosity at 90° C. [mPas] | 1310 | 1310 | 1310 | 1980 | 1980 |
| density g/l | 218 | 245 | 302 | 265 | 308 |
| tensile strength | 1.4 | 1.7 | 2.5 | 2 | 2.5 |
| elongation at break | 250 | 270 | 293 | 380 | 346 |
| tear strength | 6.2 | 6.6 | 8.5 | 8.2 | 8.3 |
| rebound resilience | 85 | 85 | 85 | 88 | 87 |
| stiffening factor at 100 Hz | . | . | . | . | . |
| tan d at RT | 0.017927162 | 0.018619822 | 0.017989784 | | |
| tan d at −30° C. | 0.088175517 | 0.092701814 | 0.095929989 | | |

3. Methods of Measurement

| | |
|---|---|
| prepolymer viscosity at 90° C. [mPas] | measured with Rheomat RM 180 viscometer (shear rate 60 s$^{-1}$) |
| density g/l | DIN 53420 |
| tensile strength | DIN 53504 |
| elongation at break | DIN 53504 |
| tear strength | DIN ISO 34-1, B |
| rebound resilience | DIN 53512 |
| tan d at RT | DIN EN ISO 6721-2 |
| tan d at −30° C. | DIN EN ISO 6721-2 |

4. Properties of Polyurethane Elastomers

A cylindrical sample piece having the dimensions (in mm) Ø35×27 is prepared as the final specimen. This cylindrical sample piece is cut out, by waterjet cutting, from a previously foamed Cellasto slab having the dimensions (in mm) 210×110×30. This cylindrical sample piece is placed between two likewise cylindrical alloy adapter plates and precompressed twice using a force of 4329.5 N and a speed of 30 mm/min (FIG. 1). The setting cycles are intended to simulate a material-based setting under accelerated conditions.

In the measuring cycle, the sample piece is precompressed by 30% of the sample height at a speed of 10 mm/min. The material displays a progressive characteristic in compression and an approximately linear region develops at 30% compression (FIG. 2). This region is often also sought in the design of component parts. The last cycle, called the measuring cycle, is recorded and analyzed by depicting the force against the distance (left-hand diagram) and the derivative as stiffness against distance (right-hand diagram). There is an ascending branch and a descending branch in the recording, but for the purpose of analysis a mean value against the distance is formed from the two branches.

Immediately following the static measurement, the sample piece is measured dynamically. The plates are moved to produce a pre-load previously read off in every measurement at a static distance of 8.1 mm (which corresponds to 30% of the sample height).

A frequency sweep up to 400 Hz is run at amplitude of 0.1 mm and the dynamic modulus against the frequency is evaluated (FIG. 3).

The project definition stipulates that the stiffening value be determined at 100 Hz. This stiffening factor is the ratio of dynamic stiffness to static stiffness. The resulting value is always >1.

The loss angle and the damping may also be considered in addition to the stiffening factor.

CITED PRIOR ART

EP 62 835 A1
EP 36 994 A1
EP 250 969 A1
DE 195 48 770 A1
DE 195 48 771 A1
EP 1 379 568 A1

We claim:

1. A method of preparing a polyurethane elastomer, comprising (i) and (ii):
   (i) reacting at least one isocyanate composition (ZI) and one polyol composition (ZP) comprising a poly-ε-caprolactone polyol and an α-hydro-ω-hydroxypoly(oxytetramethylene) polyol to obtain an isocyanate-functional prepolymer, and
   (ii) reacting the prepolymer obtained in (i) with at least one chain extender (KV) in the presence of a blowing agent.

2. The method according to claim 1, wherein the reacting in (i) is performed such that the prepolymer obtained in (i) has an isocyanate (NCO) content in the range from 2% to 8%.

3. The method according to claim 1, wherein the reacting in (i) is effected at a temperature in the range from 110° C. to 180° C.

4. The method according to claim 1, wherein the reacting in (i) is performed such that the prepolymer obtained in (i) has an isocyanate (NCO) content in the range from 8% to 22%.

5. The method according to claim 1, wherein the reacting in (i) is effected at a temperature in the range from 40° C. to 110° C.

6. The method according to claim 1, wherein the reacting in (ii) is performed in the presence of at least further component selected from the group consisting of a polyol, water, a chain-extending agent, a crosslinking agent, a catalyst, and an auxiliary.

7. The method according to claim 1, wherein the poly-ε-caprolactone polyol is obtained by reacting ε-caprolactone and a starter molecule that is a diol having a number average molecular weight in the range from 80 to 1500 g/mol.

8. The method according to claim 1, wherein the poly-ε-caprolactone polyol is obtained by reacting ε-caprolactone and at least one starter molecule selected from the group consisting of an α-hydro-ω-hydroxypoly(oxytetramethylene)diol, a polyethylene glycol and a polypropylene glycol.

9. The method according to claim 1, wherein the polyol composition comprises the α-hydro-ω-hydroxypoly(oxytetramethylene) polyol in an amount in the range from 0.1 to 50 wt %, based on the polyol composition.

10. The method according to claim 1, wherein the isocyanate composition comprises at least one isocyanate selected from the group consisting of 1,5-naphthylene diisocyanate (NDI), 4,4'-diphenylmethane diisocyanate (MDI), p-phenyl diisocyanate (PPDI) and o-tolidine diisocyanate (TODI).

11. The method according to claim 1, wherein the isocyanate composition comprises 1,5-naphthylene diisocyanate (NDI) in an amount ranging from 90 to 100 wt % based on the entire isocyanate composition.

12. The method according to claim 1, wherein the chain extender (KV) is at least one selected from the group consisting of water, a diol having a molecular weight in the range from 50 to 500 g/mol, a triol having a molecular weight in the range from 50 to 500 g/mol and a diamine having a molecular weight in the range from 50 to 500 g/mol.

13. The method according to claim 1, wherein the poly-ε-caprolactone polyol and/or the α-hydro-ω-hydroxypoly(oxytetramethylene) polyol have a number average molecular weight in the range from 1500 to 2500 g/mol.

14. A polyurethane elastomer obtained by a method that comprises (i) and (ii):
(i) reacting at least one isocyanate composition (ZI) and one polyol composition (ZP) comprising a poly-ε-caprolactone polyol and an α-hydro-ω-hydroxypoly(oxytetramethylene) polyol to obtain an isocyanate-functional prepolymer, and
(ii) reacting the prepolymer obtained in (i) with at least one chain extender (KV) in the presence of a blowing agent.

15. The polyurethane elastomer according to claim 14 wherein the polyurethane elastomer is microcellular.

16. The polyurethane elastomer according to claim 14 having a density in the range from 0.12 to 0.8 g/cm$^3$ according to DIN EN ISO 845.

17. A shaped article comprising the polyurethane elastomer according to claim 14.

18. The shaped article according to claim 17, which is a damping element, a shock absorber, a stop buffer, or part of a shoe.

19. The method according to claim 1, wherein the (Z1) component consists of 1,5-napththylene diisocyanate and the polyol component (ZP) consists of poly-ε-caprolactone polyol and α-hydro-ω-hydroxypoly(oxytetramethylene) polyol.

20. The method according to claim 19, wherein the polyol component (ZP) comprises 15-25% by weight of α-hydro-ω-hydroxy-poly(oxytetramethylene).

\* \* \* \* \*